Jan. 10, 1956   D. S. ROUND   2,730,351
COUNTER SCALES OF THE OVER AND UNDER WEIGHT TYPE
Filed Nov. 25, 1952
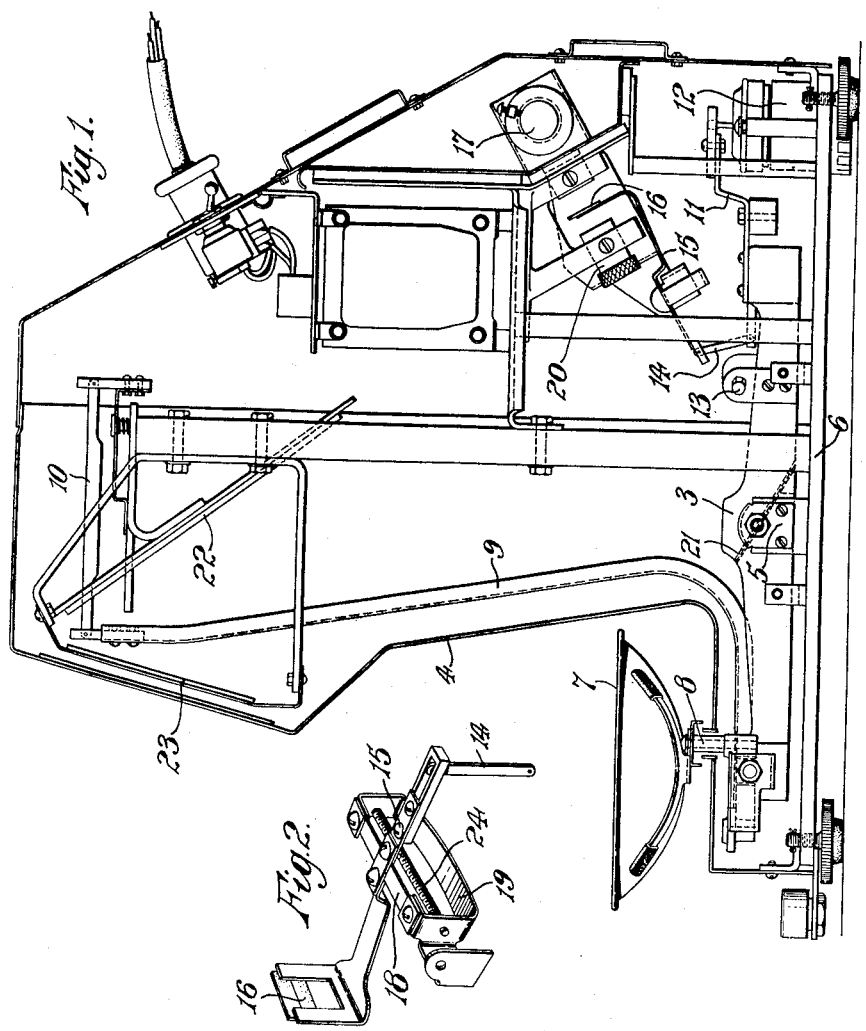
INVENTOR
David Stanley Round
By Morris L. Otteman
ATTORNEYS

United States Patent Office 2,730,351
Patented Jan. 10, 1956

---

2,730,351

COUNTER SCALES OF THE OVER AND UNDER WEIGHT TYPE

David Stanley Round, Birmingham, England, assignor to W. & T. Avery Limited, Birmingham, England, a British company Application November 25, 1952, Serial No. 322,385

2 Claims. (Cl. 265—62)

---

This invention has reference to improvements connected with counter scales of the over and under weight type which embody a light projection indicator.

The object of the present invention is to incorporate in scales of this type a movable screen or graticule which is normally disposed in the projecting beam of light, the motion whereof can be adjusted to accord with the required degree of over and under weight.

The invention consists of the incorporation in a counter scale of the over and under weight type embodying a light projection indicator of a screen or graticule mounted on a beam which is fulcrumed on a torsion strip the tension whereof can be adjusted to determine the permitted degree or arc of motion of the screen or graticule to accord with a predetermined weight.

A convenient embodiment of the present invention will now be described with reference to the accompanying drawings in which:

Fig. 1 is a side elevation of the scale with a side wall of the housing omitted to show the mechanism housed therein and Fig. 2 is a perspective view of the beam carrying the screen or graticule showing its mounting removed from the scale.

The counter scale incorporates a weighbeam 3 mounted within a housing 4 on bearings 5 on a base plate 6. This weighbeam 3 is adapted to be in equilibrium when a predetermined load is applied to a goods pan 7 supported on a bearing bracket 8 projecting through the housing from one arm of the weighbeam 3. This arm of the weighbeam carries a balance box (not shown) and the bearing bracket 8 is stabilized by an inverted Roberval type stay and link 10 of known type comprised by the arm 9 which is disposed in the upper portion of the housing.

The opposite arm of the weighbeam 3 carries an extension 11 connected to a dashpot 12 on the base plate 6 and also a screw 13 mounted obliquely across the weighbeam whereby the scale can be calibrated to read zero when the predetermined load is placed upon the weigh pan 7. This arm of the weighbeam is coupled by means of a pivotal link 14 to one arm of a beam 15 the other arm whereof carries a screen or graticule 16 adapted to interrupt a light ray emanating from a light source 17. This beam 15 is mounted intermediate its end on a length of steel ribbon 18 held in tension transversely of the beam between the limbs of a substantially U-shaped fixed bracket 19, so that the steel ribbon 18 forms the fulcrum of the beam 15 and also a torsional resistance for the over and under weight of the scale.

The screen or graticule 16 is disposed between the light source 17 and a lens system 20 so as to provide an indicator band in a ray of light emanating from the light source and reflected from an inclined reflector 21 on the base onto a reflector strip 22 and thence onto a ground glass screen 23 in the upper portion of the housing 4. Adjacent this screen 23 is a zero indicium representing the correct predetermined weight and also an indicum representing the maximum permitted weight in excess of the predetermined weight.

Mounted between the limbs of the U-shaped bracket 19 is a screw 24, rotation whereof expands or contracts the limbs of the bracket relative to one another to adjust the tension of the steel ribbon 18. It will be understood that adjustment of the tension of the steel ribbon 18 will vary its torsional resistance and thereby provide an adjustment of the degree or arc of improvement of the screen or graticule for a given weight.

I claim:

1. A counter scale of the over and under weight type having a pivoted weigh beam, a second beam linked to the weigh beam and pivotal in response to weighing movements of the weigh beam, an over and under weight indicator carried by said second beam, a torsion ribbon fixed between its ends to said second beam to receive torsional movements in response to pivotal movements thereof and having means fixed to its ends to sustain torsional forces imposed on the ribbon by said second beam, the torsion ribbon constituting a fulcrum for said second beam and providing a torsional resistance to said second beam to control the degree of pivotal movement thereof in response to overweight and underweight movements of the weigh beam.

2. A counter scale as defined in claim 1, wherein said means fixed to the ends of said ribbon are relatively adjustable to vary the tension on said ribbon and thereby vary the torsional resistance of the ribbon to pivotal movements of said second beam in response to overweight and underweight movements of the weigh beam.

References Cited in the file of this patent

UNITED STATES PATENTS

| Number | Name | Date |
|---|---|---|
| 262,907 | Roeder | Aug. 15, 1882 |
| 1,357,731 | Schaper | Nov. 2, 1920 |
| 1,623,276 | Schaper | Apr. 5, 1927 |
| 1,660,679 | Marshall | Feb. 28, 1928 |
| 1,856,411 | Carroll | May 3, 1932 |
| 2,394,820 | Syrcher et al. | Feb. 12, 1946 |